(12) United States Patent
Hunt et al.

(10) Patent No.: US 11,503,070 B2
(45) Date of Patent: Nov. 15, 2022

(54) TECHNIQUES FOR CLASSIFYING A WEB PAGE BASED UPON FUNCTIONS USED TO RENDER THE WEB PAGE

(71) Applicant: Microsoft Technology Licensing, LLC, Redmond, WA (US)

(72) Inventors: Adam Hunt, El Cerrito, CA (US); Joseph Linn, Emeryville, CA (US); Elias Manousos, San Francisco, CA (US); Chris Kiernan, San Francisco, CA (US); David Pon, Sunnyvale, CA (US); Jonas Edgeworth, San Francisco, CA (US); Steven Alexander Daniel Pon, El Cerrito, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/801,247

(22) Filed: Nov. 1, 2017

(65) Prior Publication Data
US 2018/0124109 A1     May 3, 2018

Related U.S. Application Data

(60) Provisional application No. 62/416,650, filed on Nov. 2, 2016.

(51) Int. Cl.
*H04L 9/40*     (2022.01)
*G06F 16/958*     (2019.01)
(Continued)

(52) U.S. Cl.
CPC ........ *H04L 63/1483* (2013.01); *G06F 16/951* (2019.01); *G06F 16/958* (2019.01);
(Continued)

(58) Field of Classification Search
CPC . H04L 63/1483; G06F 16/951; G06F 16/958; G06F 21/563; G06F 17/2247; G06F 21/128; G06K 9/00442; G06K 9/6267
See application file for complete search history.

(56) References Cited

U.S. PATENT DOCUMENTS 9,158,604 B1    10/2015    Christodorescu et al.
9,529,922 B1*    12/2016    Wahi ........................ G06F 16/27
(Continued)

FOREIGN PATENT DOCUMENTS

EP           3002705 A1     4/2016
WO       2014101783 A1     7/2014

OTHER PUBLICATIONS

Nunan et al., 2012 IEEE, "Automatic Classification of Cross-Site Scripting in Web Pages Using Document-based and URL-based Features", pp. 702-707 (Year: 2012).*
(Continued)

*Primary Examiner* — Khalil Naghdali
(74) *Attorney, Agent, or Firm* — Wade IP Law PLLC (57) ABSTRACT

The present disclosure generally relates to web page analysis, and more particularly to a classification system for web pages. The classification system may classify a web page as malicious based upon one or more signatures generated for the web page. For example, the classification system may compare one or more signatures generated for a first web page to one or more signatures generated for a second web page, where the first web page and the second web page are the same web page at different times or different web pages. Based upon a similarity of the signatures, the classification system may output whether the first web page is malicious. For another example, the classification system may include a classification model that is trained based upon one or more signatures for one or more classified web pages. The clas-
(Continued)

sification model may output whether the web page is malicious.

20 Claims, 5 Drawing Sheets (51) Int. Cl.
G06F 21/56 (2013.01)
G06F 21/12 (2013.01)
G06F 16/951 (2019.01)
G06F 40/143 (2020.01)
G06V 30/40 (2022.01)
G06K 9/62 (2022.01)

(52) U.S. Cl.
CPC .......... *G06F 21/128* (2013.01); *G06F 21/563* (2013.01); *G06F 40/143* (2020.01); *G06K 9/6267* (2013.01); *G06V 30/40* (2022.01)

(56) References Cited

U.S. PATENT DOCUMENTS

| 9,741,065 | B2* | 8/2017 | Collet | G06Q 30/0631 |
| 2009/0292677 | A1* | 11/2009 | Kim | G06F 16/958 |
| 2015/0046712 | A1* | 2/2015 | Korkishko | H04L 63/067 |
| | | | | 713/170 |
| 2016/0094572 | A1* | 3/2016 | Tyagi | H04L 63/1425 |
| | | | | 726/23 |

OTHER PUBLICATIONS

Rajab et al., "Trends In Circumventing Web-Malware Detection", Jul. 31, 2011.
World Intellectual Property Organization, Application No. PCT/US17/59663, International Search Report dated Jan. 24, 2018.
World Intellectual Property Organization, Application No. PCT/US17/59663, Pending Claims as of Jan. 24, 2018.

* cited by examiner

| Summary | | Javascript Invocation Counts | |
|---|---|---|---|
| | | invocation | invocations |
| URL | https://magicoffer.site/c/e92eb187-ba10-11e5-8565-02f6361de079 | concat | 656 |
| Guid | c2956706-17b0-4dcc-99a6-23d1d7541130e | Array.push | 261 |
| Title | | node.appendChild | 200 |
| Load Date | Tue Oct 31 14:46:50 PDT 2017 | createElement | 200 |
| IP Address | 52.53.86.216 | setInnerHTML | 198 |
| Successful | true | newString | 117 |
| HTTP Method | GET | newDate | 69 |
| Response Code | 200 | Date.valueOf/getTime | 68 |
| Response Message | OK | char/charCodeAt | 48 |
| Content Type | text/html | toString/valueOf | 45 |
| Character Set | UTF-8 | toString | 45 |
| Is HTML Page | true | replace | 43 |
| Is From Cache | false | charAt | 32 |
| Local Content Length | 14.05 K | setTextContent | 28 |
| Overall Content Length | 14.05 K | fromCharCode | 23 |
| Local Response Time | 1.23 s | Array.indexOf | 16 |
| Overall Response Time | | | |

TECHNIQUES FOR CLASSIFYING A WEB PAGE BASED UPON FUNCTIONS USED TO RENDER THE WEB PAGE

CROSS-REFERENCES TO RELATED APPLICATIONS

The present application is a non-provisional application and claims the benefit and priority under 35 U.S.C. 119(e) of U.S. Provisional Application No. 62/416,650, filed Nov. 2, 2016 entitled "USING JAVASCRIPT EXECUTION PATTERNS TO CLASSIFY WEB PAGES," the entire contents of which is incorporated herein by reference for all purposes.

BACKGROUND

As the Internet becomes more widespread, network attacks are becoming more and more common. Such network attacks are often embedded into web pages, creating security threats for users of the web pages without hosts of the web pages being aware. For example, one common network attack includes phishing, which is when a web page represents itself as being associated with a false identity in order to obtain sensitive information or other valuables from a user. Many times phishing attacks may be initiated by a malicious third party hacking into a legitimate website provided by a host and embedding software into one or more web pages of the website to facilitate phishing attacks without the host knowing. However, many network attacks are obfuscated in web pages, making it difficult for detection of malicious behavior. For example, a web page may be implemented with dynamic elements (e.g., a function) that are invoked while rendering the web page. Therefore, there is a need in the art to better detect malicious behavior in web pages.

SUMMARY

The present disclosure generally relates to web page analysis, and more particularly to classifying web pages.

In certain embodiments, a classification system may classify a web page as malicious based upon one or more signatures generated for the web page. For example, the classification system may compare one or more signatures generated for a first web page to one or more signatures generated for a second web page, where the first web page and the second web page are (1) the same web page at different times or (2) different web pages. When the first web page is the same web page as the second web page, the classification system may be determining whether the first web page has changed relative to the second web page. When the first web page is different than the second web page, the classification system may be determining whether the first web page is similar to the second web page, where the second web page has been classified as malicious. Based upon the comparison, the classification system may output whether the first web page is malicious.

For another example, the classification system may include a classification model (e.g., a neural network or a decision tree) for classifying the web page as malicious. The classification model may be trained based upon one or more signatures for (1) the web page at different times or (2) one or more classified web pages that are different than the web page.

In some examples, an anomaly detection model (e.g., k-means sigma based model) may be used to confirm that a web page is malicious. The anomaly detection model may distinguish between whether the malicious classification is due to a known pattern or an unknown pattern. If the malicious classification is due to an unknown pattern, information associated with the web page may be reviewed by an administrator to identify the unknown pattern. In such examples, the anomaly detection model may be used in concert with the classification system described above or after the classification model determines that the web page is malicious. The classification model may output whether the web page is malicious.

In one illustrative example, a web page document may be received for rendering a web page. The web page document may be parsed to render the web page. While rendering the web page, one or more functions (e.g., JavaScript) may be invoked. In some examples, when a type of function is invoked, the invocation may be tracked such that when the web page is rendered, a number of times that the type of the function was invoked is recorded.

After the web page is rendered, one or more attributes may be determined for the web page, each attribute associated with one or more functions. In some examples, an attribute associated with multiple functions may include the multiple functions in an ordered list based upon when the functions were invoked in relation to each other (e.g., when a second function is invoked after a first function, the ordered list may include the first function and then the second function). Each attribute may also be associated with a number of times that each function associated with the attribute was invoked to render the web page.

After the one or more attributes are determined, one or more signatures may be generated for the web page, where a signature includes the one or more attributes with a number of times functions associated with each attribute were invoked. In some examples, multiple signatures may be generated, each signature based upon one or more different attributes.

Then, using the one or more signatures, a classification of the web page may be determined as described above. The classification may indicate whether the web page is malicious. After being determined, the classification for the web page may be output. In some examples, when the web page is indicated as being malicious, the classification system may output that the network asset associated with the web page might be malicious. Examples of network assets include domains, hosts, domain name system (DNS) name servers, Internet protocol (IP) addresses, etc.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

The present disclosure generally relates to web page analysis, and more particularly to classifying web pages.

In certain embodiments, a classification system may classify a web page as malicious based upon one or more signatures generated for the web page. For example, the classification system may compare one or more signatures generated for a first web page to one or more signatures generated for a second web page, where the first web page and the second web page are (1) the same web page at different times or (2) different web pages. When the first web page is the same web page as the second web page, the classification system may be determining whether the first web page has changed relative to the second web page. When the first web page is different than the second web page, the classification system may be determining whether the first web page is similar to the second web page, where the second web page has been classified as malicious. Based upon the comparison, the classification system may output whether the first web page is malicious.

For another example, the classification system may include a classification model (e.g., a neural network or a decision tree) for classifying the web page as malicious. The classification model may be trained based upon one or more signatures for (1) the web page at different times or (2) one or more classified web pages that are different than the web page.

In some examples, an anomaly detection model (e.g., k-means sigma based model) may be used to confirm that a web page is malicious. The anomaly detection model may distinguish between whether the malicious classification is due to a known pattern or an unknown pattern. If the malicious classification is due to an unknown pattern, information associated with the web page may be reviewed by an administrator to identify the unknown pattern. In such examples, the anomaly detection model may be used in concert with the classification system described above or after the classification model determines that the web page is malicious. The classification model may output whether the web page is malicious.

In one illustrative example, a web page document may be received for rendering a web page. The web page document may be parsed to render the web page. While rendering the web page, one or more functions may be invoked. In some examples, when a type of function is invoked, the invocation may be tracked such that when the web page is rendered, a number of times that the type of the function was invoked is recorded.

After the web page is rendered, one or more attributes may be determined for the web page, each attribute associated with one or more functions. In some examples, an attribute associated with multiple functions may include the multiple functions in an ordered list based upon when the functions were invoked in relation to each other (e.g., when a second function is invoked after a first function, the ordered list may include the first function and then the second function). Each attribute may also be associated with a number of times that each function associated with the attribute was invoked to render the web page.

After the one or more attributes are determined, one or more signatures may be generated for the web page, where a signature includes the one or more attributes with a number of times functions associated with each attribute were invoked. In some examples, multiple signatures may be generated, each signature based upon one or more different attributes.

Then, using the one or more signatures, a classification of the web page may be determined as described above. The classification may indicate whether the web page is malicious. After being determined, the classification for the web page may be output. In some examples, when the web page is indicated as being malicious, the classification system may output that the network asset associated with the web page might be malicious. Examples of network assets include domains, hosts, domain name system (DNS) name servers, Internet protocol (IP) addresses, etc.

I. Exemplary Distributed System

Figure 1:
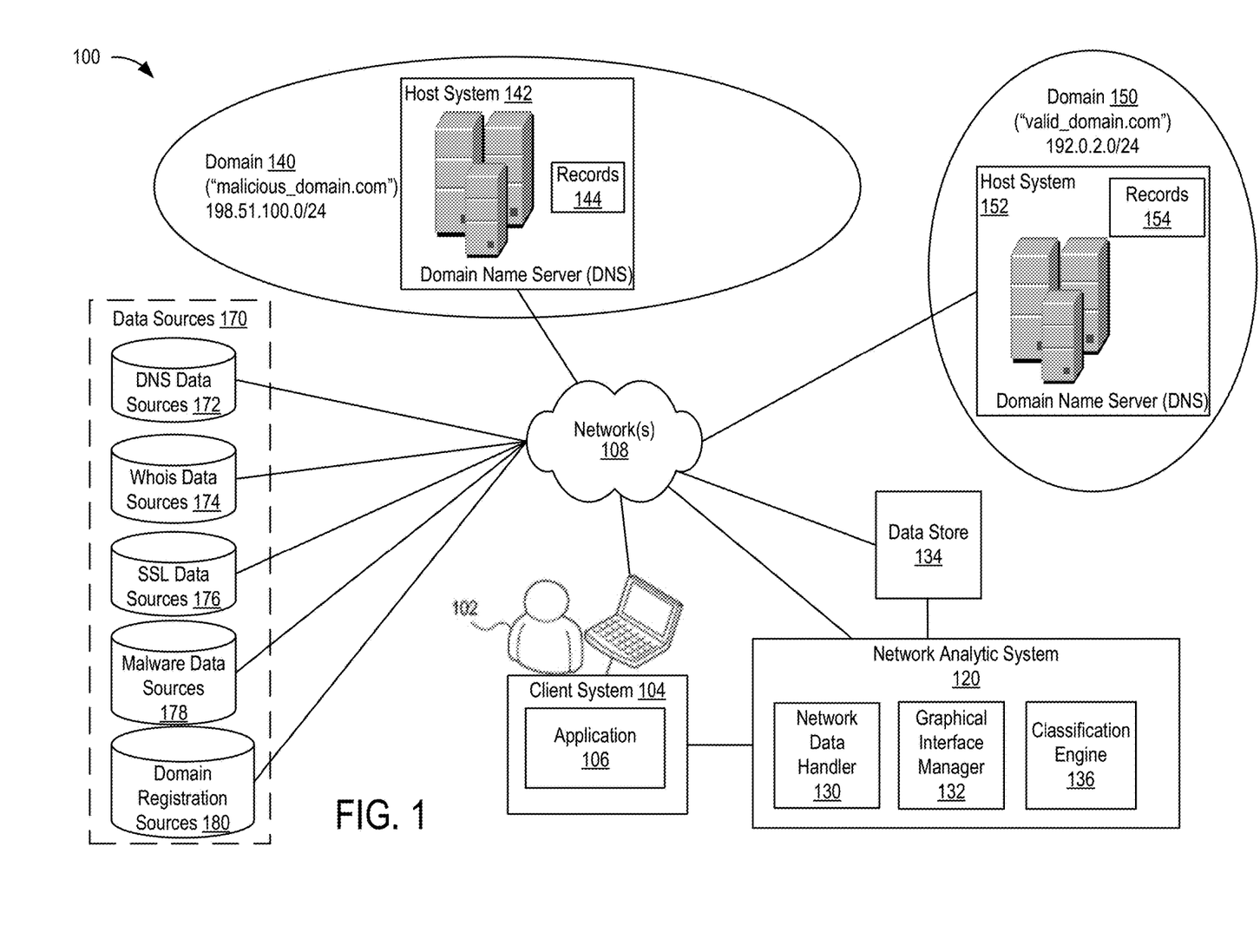
FIG. 1 is a simplified block diagram of a distributed system according to certain embodiments.

FIG. 1 is a simplified block diagram of distributed system 100 according to certain embodiments. Distributed system 100 is not intended to suggest any limitation as to scope of use or functionality of described embodiments.

Distributed system 100 may include one or more client systems 104 (referred to herein as "client system" or "client") and network analytic system 120. Network analytic system 120 may be implemented by a computing system. Client system 104 may be operated by one or more users (e.g., user 102), such as a network analyst whose role it is to assess network activity and to determine possible malicious events related to the network activity.

Client system 104 may present a user interface (e.g., a graphical user interface or a command prompt), or a combination thereof to a user. The user interface may be generated by client system 104, received from network analytic system 120, or a combination thereof. The user interface may be updated or modified by client system 104 or network analytic system 120 in response to one or more interactions by the user with the user interface.

Figure 3:
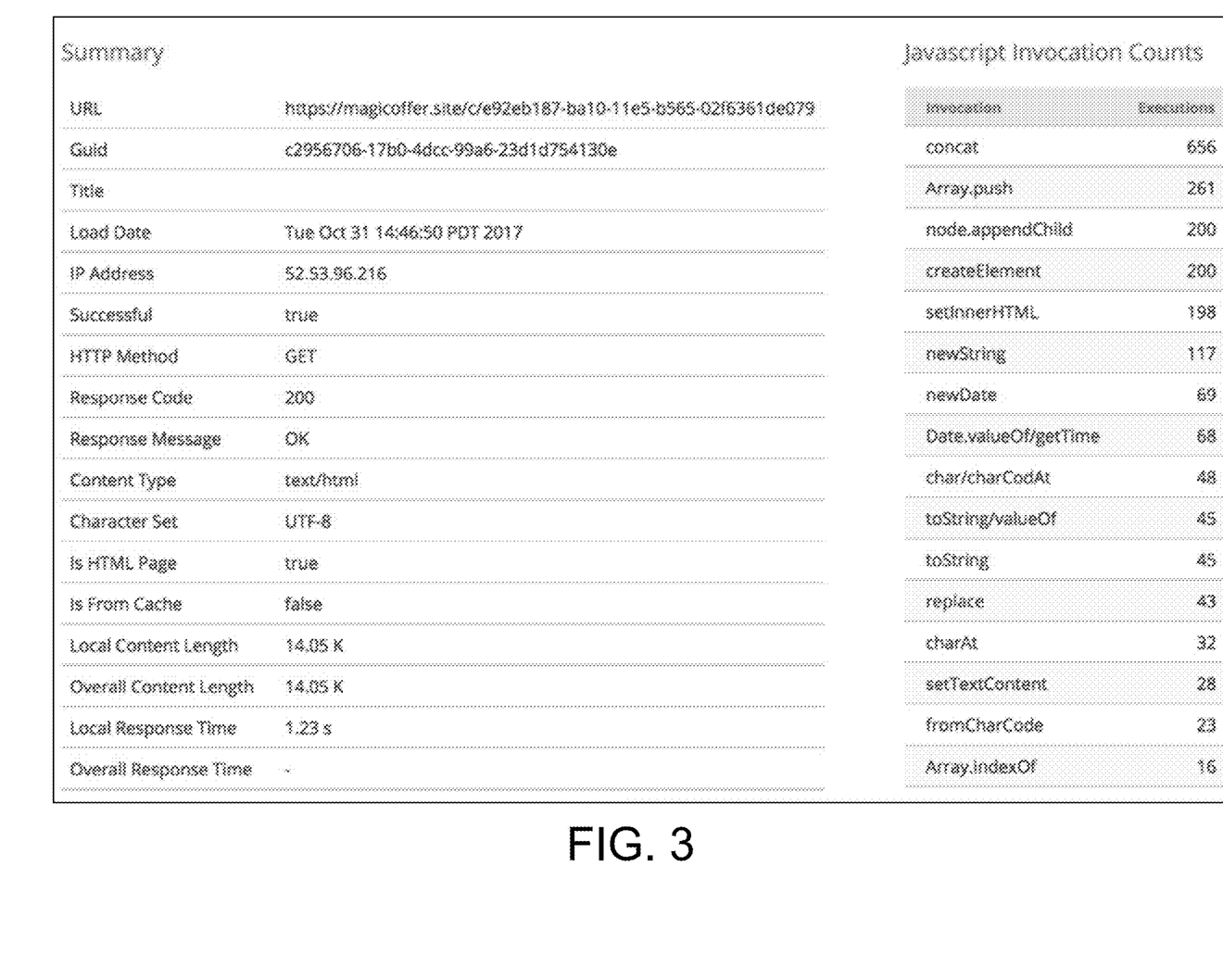
FIG. 3 is an example of a user interface displaying attributes for a web page according to certain embodiments.
Figure 4:
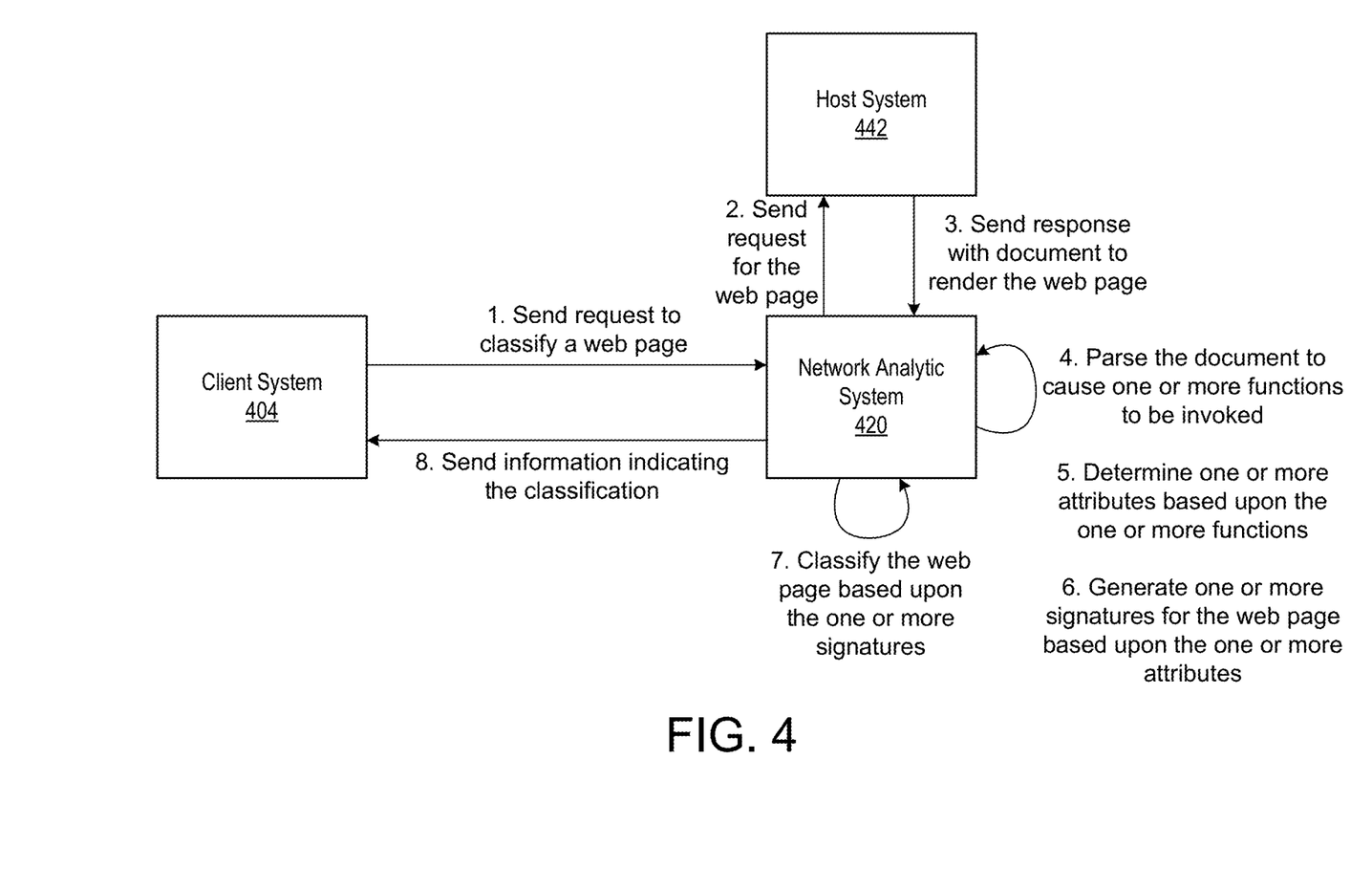
FIG. 4 is a simplified block diagram of communications sent in a distributed system according to certain embodiments.

The user interface may be provided by network analytic system 120 via network 108 as part of a service (e.g., a cloud service) or application. For example, network analytic system 120 may expose an application programming interface (API) such that the API may be used as the user interface. For another example, a graphical user interface, such as illustrated in FIGS. 3 and 4, may be provided. In some embodiments, client system 104 may provide access to one or more applications 106 ("app"). App 106 may enable a user to access and perform services provided by network analytic system 120.

Client system 104 and network analytic system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Figure 5:
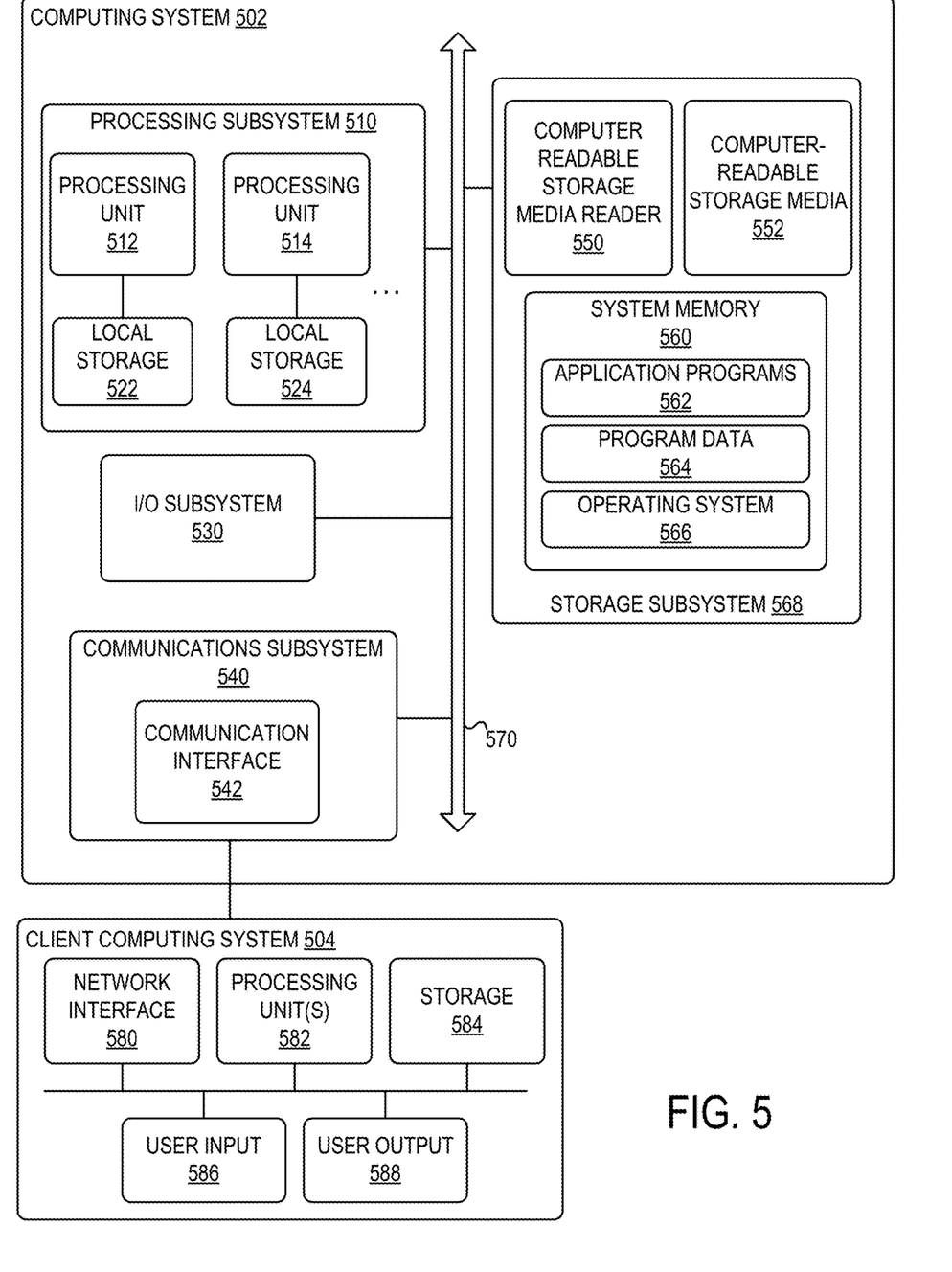
FIG. 5 is a simplified block diagram of a computing system and a client computing system usable to implement some embodiments.

Network analytic system 120 may be implemented using a computer system (such as illustrated in FIG. 5), which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analytic system 120 may run any operating system or a variety of additional server applications and/or mid-tier applications, including HTTP servers, FTP servers, CGI servers, Java servers, database servers, and the like. Exemplary database servers include without limitation those commercially available from Microsoft, and the like. In one example, network analytic system 120 may be included in or implemented with a product provided by RiskIQ® Corporation. In some embodiments, network analytic system 120 may be implemented with or included in any of the systems incorporated by reference, such as the systems described in a patent or patent application referenced in this disclosure. In various embodiments, network analytic system 120 may be configured to run one or more services or software applications described in the foregoing disclosure. Network analytic system 120 may correspond to a computing system for performing processing as disclosed herein according to an embodiment of the present disclosure.

In some embodiments, network analytic system 120 may be implemented as an enterprise computing system or a cloud computing system comprising one or more computers and/or servers that may include those described above. Network analytic system 120 may include several subsystems and/or modules, including some, which may not be shown. For example, network analytic system 120 may include network data handler 130, graphical interface manager 132, and classification engine 136. Network analytic system 120 may have more or fewer subsystems and/or modules than shown in the figure, may combine two or more subsystems and/or modules, or may have a different configuration or arrangement of subsystems and/or modules. Subsystems and modules of network analytic system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analytic system 120 may also provide other services or software applications may include non-virtual and virtual environments. In some embodiments, these services may be offered as web-based or cloud services or under Software as a Service (SaaS) model to the users of client system 104. The services offered by network analytic system 120 may include application services. Application services may be provided by network analytic system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers may utilize applications executing in network analytic system 120, which may be implemented as a cloud infrastructure system. Users may acquire the application services without the need for customers to purchase separate licenses and support. Various different SaaS services may be provided. Users operating client system 104 may in turn utilize one or more applications to interact with network analytic system 120 to utilize the services provided by subsystems and/or modules of network analytic system 120.

Network analytic system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes disclosed herein. The memory in network analytic system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Distributed system 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, distributed system 100 may be coupled to or may include one or more data sources, such as DNS data sources 172, WHOIS data sources 174, SSL data sources 176, malware data sources 178, and domain registration data sources 180. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analytic system 120 using network 108.

Distributed system 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, distributed system 100 may be coupled to or may include one or more data stores, such as network data store 134. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be accessible by network analytic system 120 using network 108.

Distributed system 100 may include one or more network domains (e.g., an Internet domain), such as domain 140 and domain 150. Each domain may be implemented by a host system, which implements a domain name server (DNS) for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 and domain 150 may be mapped (e.g., via DNS) to one or more IP addresses. Domain 150 may include a host computing system 152. Host computing system 152 may store records 154 to implement a DNS for domain 150. Domain 140 may be communicatively connected to network 108 via an access network. Domain 150 may be communicatively connected to network 108 via an access network.

It should be noted that although not shown in FIG. 1, each of domain 140 and domain 150 may include one or more sub-domains. Each domain may also be a sub-domain of a larger domain. A domain may map to one or more IP addresses (e.g., via DNS), where each IP address is associated with a host (e.g., a host computing system). A host or host system as referred to herein may include one or more domains, and one or more IP addresses associated with each domain. As used herein, a host may include general purpose computers, as well as other devices, that have an IP address.

Distributed system 100 may implement one or more techniques for classifying web pages, as described further below. The techniques may be useful for tracking and analyzing network infrastructure for network-based assets. Such assets may be owned or associated with an entity (e.g., a company or network domain). Examples of network-based assets include, without restriction, domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.).

Individual embodiments may be described as a process which may be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, network analytic system 120 may implement the processes disclosed herein. Any of the processes may be implemented as a service to a user of network analytic system 120.

The particular series of processing steps disclosed herein are not intended to be limiting. Other sequences of steps may also be performed according to alternative embodiments. For example, alternative embodiments of the present disclosure may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

The one or more techniques for classifying web pages may be performed by network analytic system 120 to classify network-based digital assets. For example, a classification may be determined based upon one or more signatures generated for those web pages. The classification of web pages may be useful for determining relationships between network-based assets for network infrastructure analysis. Such network-based digital assets may be owned or associated with an entity (e.g., a company or network domain). Examples of network-based digital assets include, without restriction, domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.).

The one or more techniques may include determining a configuration for each of one or more crawl processes to gather data about network-based assets. The process may include receiving a crawl configuration via one or more interfaces. The interfaces may be generated by graphical interface manager 132 and provided to a client system for presentation. One or more crawl processes may be determined based on the crawl configuration(s). Crawl processes may be generated using one or more instructions (e.g., code or script). Crawl processes may be implemented to search networks, e.g., the Internet, for network-based assets according to a crawl configuration. In some embodiments, a crawl process may be implemented starting with one or more network-based assets as a source (e.g., a target network-based asset) from which to initiate a crawl process. The source may be chosen based on input by a user. The source as the basis for a crawl may be based on one or more network-based assets that are identified as being malicious, such as by techniques disclosed in U.S. Non-provisional application Ser. No. 14/938,802 entitled "IDENTIFYING PHISHING WEB SITES USING DOM CHARACTERISTICS" and filed on Nov. 11, 2015, in U.S. Non-Provisional patent application Ser. No. 14/938,814 entitled "USING HASH SIGNATURES OF DOM OBJECTS TO IDENTIFY WEBSITE SIMILARITY" and filed on Nov. 11, 2015, and in U.S. Ser. No. 15/787,654 entitled "HOST PAIR DETECTION" and filed on Oct. 18, 2017. Each of the above-identified applications are considered part of this disclosure and are incorporated herein by reference for all purposes.

The crawl processes may be implemented in or using a discovery and inventory process, such as for discovery and inventory system disclosed in U.S. Non-Provisional patent application Ser. No. 14/520,029 filed on Oct. 21, 2014 and entitled "SYSTEM AND METHOD FOR IDENTIFYING INTERNET-FACING ASSETS." The above-identified application is considered part of this disclosure and is incorporated herein by reference for all purposes. Network data handler 130 may implement processes to generate and/or identify network data. In some embodiments, the process may include network data handler 130 gathering data from data sources 170 corresponding to network-based assets identified during a crawl process. The crawl processes may be implemented according to a schedule that is part of the configuration. The crawl process is a dynamic process by which web pages of network-based assets are dynamically rendered at the time when the crawl process is implemented.

In at least one embodiment, a crawl process may be implemented using techniques for crawling one or more sources, such as a web page of a host. The crawl process may be implemented to traverse through a source, such as a web page to identify different network-based assets and the relationships between those assets. The crawl process may include identifying a function in a document for rendering web pages, such as a redirect link, an image retrieval function, a script (e.g., JavaScript), or other function of a network-based asset. The crawl process may be configured to determine the extent to which relationships are identified and traversed. In some embodiments, a crawl process may be restricted so as to not overburden and/or notify a malicious network-based asset of crawling that might lead to detection of malicious behavior. A crawl process may include performing any of the techniques disclosed herein for crawling.

In some embodiments, a crawl process may include processing data of network-based assets and rendering elements of a web page for a network-based asset. Any function in a web page of a web site that is crawled may be rendered. Network-based assets may be identified to the extent defined by a crawl configuration. A web page may be rendered according to a model (e.g., a document object model). Active code and frames in a web page may be rendered. Redirects in a web page may be followed. Images and functions in a web page may be obtained or activated. The crawl process may monitor and log information about network-based assets identified in the crawl process. The data may be updated as crawl processes are scheduled to be repeated.

The process may include determining attributes, including, without restriction, frequency based on occurrence of a relationship, similarity between network-based assets that are identified as being related, the nature of the relationship (e.g., parent and child), a type of link (e.g., a cause of the relationship), any other information about a relationship between assets, similarity of neighbors that are related to an asset, or combinations thereof. The factors may be weighted based on the asset which is analyzed for relationships. The measure of a relationship may be based on one or more measures, such as a mean (e.g., a harmonic mean) of the factors and the weights assigned to each of those factors. The relationships between assets may be computed based on a request by a user with respect to any network-based asset. More weight may be applied to assets that have been previously identified as malicious. Information about previously identified malicious assets may be considered in determining a relationship using the crawl process.

The process may use graphical interface manager 132 to generate and provide interfaces to display information about classifications. The interfaces may be provided as part of an application. The application may be provided as a service or code to a client system. The interfaces may provide information about analysis of the web pages such as malicious behaviors and patterns. The malicious behavior may be presented as a suspect list or blacklists. The malicious behavior may be combined with other previously identified malicious behavior to provide a more comprehensive analysis of network security threats.

II. Processing Performed to Classify a Web Page

Figure 2:
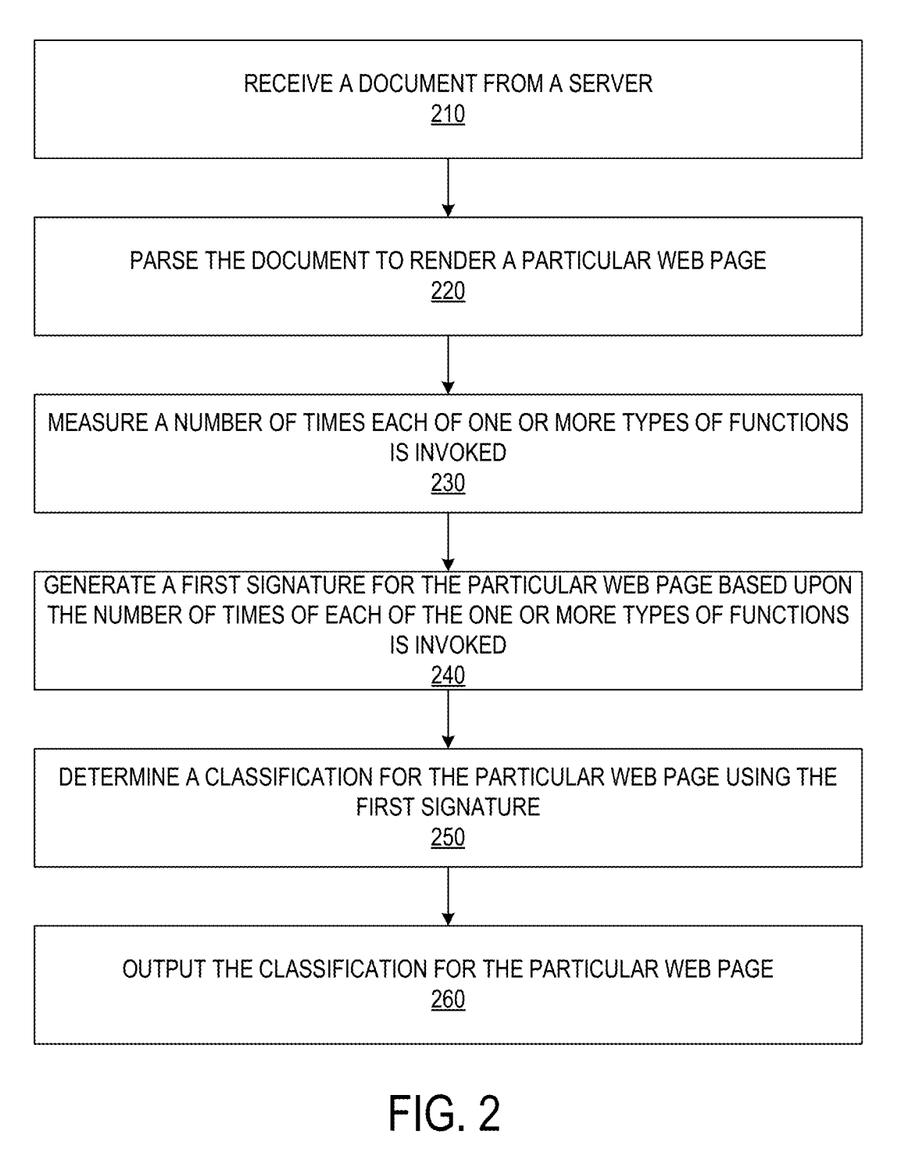
FIG. 2 is a simplified flowchart depicting processing performed by a classification system according to certain embodiments.

FIG. 2 is a simplified flowchart depicting processing performed by a classification system (e.g., classification engine 136) to classify a web page according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain embodiments, the steps may be performed in some different order or some steps may also be performed in parallel.

At 210, a document is received from a server. The document may be received in response to a request (e.g., an HTTP message) for the document sent to the server by the classification system using a URI that corresponds to a particular web page hosted by the server. The request may be sent to the server in response to the classification system receiving a message indicating to classify the particular web page corresponding to the URI. In some examples, the message may be received as a result of a crawl as described above. In other examples, the message may be received from a user. In other examples, the message may be received based upon a timer that repeatedly sends the message after an amount of time has elapsed as a form of monitoring the particular web page. The document may include one or more functions used to render the web page when the document is parsed. Examples of functions include pushState, anchor, enumerateDevices, Math.round, setTime, setOuterHTML, getInnerHTML, toLocale/Time/Date/String, clientInformation, atob, doNotTrack, oscpu, availLeft, availHeight, createElement, fromCharCode$write, moveBy, plugins, replace, ActiveX.AgControl.AgControl, fontcolor, frameElement, location, Date.parse, pixelDepth, valueOf, insertAdjacentElement, ActiveX.XMLDocument, Date.UTC, get/UTC/Hours, appendChild, local Storage, fontsize, setBufferDepth, deviceXDPI, toLocaleUpperCase, codePointAt, setInterval, Math.max, setTop, availTop, Array.pop, setTextContent, moveTo, startsWith, normalize, big, deviceYDPI, setUpdateInterval, appName, newActiveX, fontSmoothingEnabled, newDate, lastIndexOf, get/UTC/Minutes, toUTCString, Array.reverse, italics, strike, alert, ActiveX.Unknown, decodeURIComponent, ActiveX.JavaWebStart.isInstalled, localeCompare, vendorSub, fromCharCode, userLanguage, ActiveX.PDF.PdfCtrl.6, getElementsByTagName, bold, push, get/UTC/Date, left, appVersion, cpuClass, toLowerCase, concat, vibrate, sessionStorage, get/UTC/Milliseconds, ActiveX. ShockwaveFlash. ShockwaveFlash, height, forward, setTimeout, prompt, get/UTC/Full/Year, encodeURIComponent, Math.random, toLocaleLowerCase, newString, removeBehavior, availWidth, browserLanguage, devicePixelRatio, btoa, Math.ceil, to/Time/Date/String, resizeTo, userAgent, Math.abs, open, setLeft, ActiveX.AcroPDF.PDF, clearinterval, Array.shift, addBehavior, insertAdjacentHTML, ActiveX. Google. OneClickCtrl.8, geolocation, match, Array.concat, encodeURI, setInnerText, eval, mimeTypes, globalStorage, small, msDoNotTrack, Array.splice, Array.unshift, writeln, endsWith, document.appendChild, go, ActiveX.JavaPlugin, resizeBy, setDate, outerHeight, Array.push, ActiveX.JavaWebStart.isInstalled.1.6.0.0, blink, Array.sort, language, escape, activex, trimRight, Array.indexOf, node.appendChild, setInnerHTML, toSource, bufferDepth, cookie, ActiveX.PDF.PdfCtrl, systemLanguage, get/UTC/Seconds, split, mediaDevices, parseFloat, clipboardData, slice, ActiveX.XMLHttpRequest, link, postMessage, get/UTC/Month, cookieEnabled, substr, back, replace State, newRegExp, setYear, createPopup, char/charCodeAt, fixed, battery, confirm, Math.exp, innerHeight, trimLeft, ActiveXObject, isNaN, scriptEngine, updateInterval, toString, outerWidth, sub, Math.min, indexedDB, javaEnabled, connection, toString/valueOf, innerWidth, getOuterHTML, substring, repeat, decodeURI, getTimezoneOffset, trim, getInnerText, platform, parseInt, Date.now, vendor, close, toUpperCase, includes, Array.slice, exec, get/UTC/Day, includes/starts/endsWith, sup, setLocation, Math- .pow, batteryProp, Date.valueOf/getTime, Array.lastIndexOf, console, width, top, indexOf, buildID, Array.join, unescape, write, colorDepth, ActiveX.JavaPlugin.160_16, Math.floor, char/charCodAt, search, charAt, ActiveX.XSLTemplate, etc. The document may further include one or more inactive elements (sometimes referred to as static element).

At 220, the document is parsed to render the particular web page. Parsing the document may cause the one or more functions associated with the document to be invoked. The discussion here is based upon invocation rather than execution. Innovation may include both interpreted scripts and executed scripts. Tracking invocations allows the classification system to capture functions that fail to produce an output or that produce an error because of a system not supporting the function. For example, a function may be associated with a first browser such that when the function is invoked on a second browser, the function fails. It should be recognized that other examples may be based upon execution and/or completion of a function that produces an output.

At 230, a number of times each of one or more types of functions is invoked may be measured. For example, each time a type of function is invoked, a counter may be increased for the type of function. In addition to the number, an identification of the function and an order that the function was executed in relation to other functions may be determined.

At 240, a first signature may be generated for the particular web page based upon the number of times of each of the one or more types of functions is invoked. For example, the first signature may include one or more attributes. Each attribute may include a type of function paired with a number of times the type of function was invoked when rendering the web page. In some examples, an attribute may include multiple types of functions, each type of function paired with a number of times the type of function was invoked when rending the web page. An example of an attribute is {"functionname":"Array.concat","functioncount":7}. Another examples of an attribute is {"functionname":"Array.concat","functioncount":7; "functionname":"replace","functioncount":38}. Another example of an attribute is "pushState":161. An example of a first signature is [{"functionname":"Array.concat","functioncount":7}, {"functionname":"replace","functioncount":38}]. FIG. 3 illustrates an example of several types of functions (referred to as invocation in FIG. 3) with a number indication a number of invocations of the types of functions (referred to as executions in FIG. 3). In some examples, each of the attributes may be weighted.

In some examples, an attribute may include an order that multiple functions included in the attribute were executed when rendering the web page. For example, an attribute may include a measure (e.g., a count) of each function executed in a sequence. In one illustrative example, if 'charAt' function is followed by 'decodeURI' function invoked 20 times and 'decodeURI' function is followed by 'userAgent' function 30 times, an attribute may be represented as {'charAt_decodeURI':20, 'decodeURI_userAgent':30}. In some examples, a signature may include an order that multiple attributes included in the signature were executed when rendering the web page, similar to as described above for an attribute.

In some examples, multiple signatures may be generated for the web page. For example, a different signature may be determined for each set of one or more attributes. For another example, multiple signatures may be generated using the same one or more attributes, each signature generated differently.

At 250, a classification is determined for the particular web page using the first signature. In some examples, the classification may indicate whether the web page is malicious. In such examples, the classification for the first signature may be imputed on a network-based asset associated with the web page. For example, a host of the web page may be determined to be malicious when the web page is determined to be malicious. In other examples, the classification may indicate a type of network attack that is associated with the web page.

The classification may be determined based upon a second signature of a web page. In some examples, the web page associated with the second signature may be the same web page as the one being classified but at a different time. In other examples, the web page associated with the second signature may be a different web page than the one being classified.

In some embodiments, the classification may be determined by comparing the first signature with the second signature. When the first signature and the second signature are within a threshold of similarity (e.g., match or similar), a classification for the second signature may be determined as the classification for the web page being classified. In such embodiments, the second signature may be a part of a corpus of classified signatures, each signature of the corpus of classified signatures compared with the first signature.

In other embodiments, the classification may be determined using a classification model. The classification model may be used to classify the web page by determining a likelihood that the first signature is a particular type of classification. In some examples, the classification model may be a neural network that is trained using signatures that are each paired with a type of classification (i.e. their classification is known). To determine the classification, the neural network may take the first signature as input. The output of the neural network may then be the classification. In other examples, the classification model may be a clustering technique. The clustering technique may attempt to cluster the first signature with other signatures that have been classified. When the first signature is clustered with a signature having a particular classification, the first signature may be classified with the particular classification. Other examples of classification models include a decision tree model.

When multiple signatures are generated for the web page, each signature may be classified based upon the steps described above. When a number of the multiple signatures are determined to be a particular classification, the web page may be determined to be the particular classification.

In some examples, multiple classification models may be used to determine the classification for the particular web page. In such examples, each model may be selected based upon one or more functions (and/or one or more attributes) associated with the particular web page. For example, when one or more functions are present for the particular web page, a particular model may be used for the one or more functions. When a number of the multiple classification models are determined to be a particular classification, the particular web page may be determined to be the particular classification.

While this description describes a request for a single web page, it should be recognized that the request may be for multiple web pages, where each of the multiple web pages are classified based on this process. After the multiple web pages are classified, a classification may be determined for the multiple web pages as a whole. For example, if a number of web pages that have been classified as malicious exceeds a threshold, the multiple web pages as a whole may be classified as malicious. By classifying a group of web pages, it may be determined whether a particular host, domain, or other network-based asset associated with the multiple web pages is malicious.

In some examples, an anomaly detection model (e.g., k-means sigma based model) may be used to confirm that the particular web page is malicious. The anomaly detection model may distinguish between whether the malicious classification is due to a known pattern or an unknown pattern. If the malicious classification is due to an unknown pattern, information associated with the particular web page may be reviewed by an administrator to identify the unknown pattern. In such examples, the anomaly detection model may be used in concert with the classification system described above or after the classification model determines that the particular web page is malicious.

At 250, the classification of the particular web page is output. The classification may be in response to the classification system outputting the classification or the anomaly detection model confirming that the particular web page is malicious. In some examples, the classification may be used to provide information indicating malicious network activity, such as malicious activity associated with network-based assets that are associated with or related to the web page that is classified as malicious. For example, the classification may indicate that the web page is malicious because of a particular function. In such an example, a network-based asset that is called by the particular function may be output as malicious.

The techniques disclosed herein for classifying web pages and websites may be implemented in and/or using the techniques disclosed in U.S. Non-provisional application Ser. No. 14/938,802 entitled "IDENTIFYING PHISHING WEB SITES USING DOM CHARACTERISTICS" and filed on Nov. 11, 2015 and U.S. Non-provisional application Ser. No. 14/938,814 entitled "USING HASH SIGNATURES OF DOM OBJECTS TO IDENTIFY WEBSITE SIMILARITY," filed on Nov. 11, 2015, and now issued as U.S. Pat. No. 9,386,037. Each of the above-identified applications are considered part of this disclosure and are incorporated herein by reference for all purposes. The classification of web pages and websites as disclosed herein may be implemented in addition to the techniques disclosed in each of the above-identified applications. The techniques disclosed herein may be modified by one skilled in the art to determine a relationship between any type of network-based assets.

III. Example Modules and Communications

FIG. 4 is a simplified block diagram of communications sent in a distributed system according to certain embodiments. The distributed system may include client system 404 (similar to client system 104 in FIG. 1), network analytic system 420 (similar to network analytic system 120), and host system 442 (similar to first host system 142). However, it should be recognized that there may be more or less systems than that depicted in FIG. 4. For example, there may be other host systems and other client systems.

A first communication that may be sent in the distributed system is a request (referred to as a first request above) to classify a web page (indicated by "1." in FIG. 4). The first request may be from client system 404 to network analytic system 420. The first request may include an identification of a network-based asset that may be used to identify a web page. Examples of network-based assets include domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.). For illustrative examples, the network-based asset may be a URI (e.g., data.htm, dmn.tld/page.htm, or ftp://ste.org/file.pdf) for a web page hosted by host system 442.

Based upon the URI, network analytic system 420 may generate an HTTP request (referred to as a second request above) to send to host system 442 (indicated by "2." in FIG. 4). The HTTP request may be used to obtain a web page (or logic to render the web page) corresponding to the URI and stored by host system 442.

In response to the HTTP request, host system 442 may send a response to network analytic system 420 (indicated by "3." in FIG. 4). The response may include a document that may be used to build (or render) the web page. For example, the document may be a web page file that includes HTML. In some examples, the document may include a header and a body.

Network analytic system 420 may parse the document to cause one or more functions to be executed (indicated by "4." in FIG. 4). Based upon the one or more functions, one or more attributes may be determined (indicated by "5." in FIG. 4). Then, one or more signatures for the web page may be generated based upon the one or more attributes (indicated by "6." in FIG. 4). In response to the one or more signatures being generated, the web page may be classified based upon the one or more signatures (indicated by "7." in FIG. 4).

In response to classifying the web page, network analytic system 420 may send information indicating the classification to client system 404 (indicated by "8." in FIG. 4). In some examples, network analytic system 420 may send a report after multiple web pages have been classified (e.g., each web page associated with a host or each web page associated with a domain).

IV. Exemplary Computing Systems

Various operations disclosed herein may be implemented on computer systems, which may be of generally conventional design. FIG. 5 is a simplified block diagram of a representative computing system 502 and client computing system 504 usable to implement certain embodiments of the present disclosure. In various embodiments, computing system 502 or similar systems may implement network analytic system 120, or any other computing system disclosed herein or portions thereof. Client computing system 504 or similar systems may implement client system 104, or other client systems disclosed herein.

Computing system 502 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 502 may include processing subsystem 510. Processing subsystem 510 may communicate with a number of peripheral systems via bus subsystem 570. These peripheral systems may include I/O subsystem 530, storage subsystem 568, and communications subsystem 540.

Bus subsystem 570 provides a mechanism for letting the various components and subsystems of server computing system 504 communicate with each other as intended. Although bus subsystem 570 is shown schematically as a single bus, alternative embodiments of the bus subsystem may utilize multiple buses. Bus subsystem 570 may form a local area network that supports communication in processing subsystem 510 and other components of server computing system 520. Bus subsystem 570 may be implemented using various technologies including server racks, hubs, routers, etc. Bus subsystem 570 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 530 may include devices and mechanisms for inputting information to computing system 502 and/or for outputting information from or via computing system 502. In general, use of the term "input device" is intended to include all possible types of devices and mechanisms for inputting information to computing system 502. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 502 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 510 controls the operation of computing system 502 and may comprise one or more processing units 512, 514, etc. A processing unit may include one or more processors, including single core processor or multicore processors, one or more cores of processors, or combinations thereof. In some embodiments, processing subsystem 510 may include one or more special purpose co-processors such as graphics processors, digital signal processors (DSPs), or the like. In some embodiments, some or all of the processing units of processing subsystem 510 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 522, 524. Any type of processors in any combination may be included in processing unit(s) 512, 514.

In some embodiments, processing subsystem 510 may be implemented in a modular design that incorporates any number of modules (e.g., blades in a blade server implementation). Each module may include processing unit(s) and local storage. For example, processing subsystem 510 may include processing unit 512 and corresponding local storage 522, and processing unit 514 and corresponding local storage 524.

Local storage 522, 524 may include volatile storage media (e.g., conventional DRAM, SRAM, SDRAM, or the like) and/or non-volatile storage media (e.g., magnetic or optical disk, flash memory, or the like). Storage media incorporated in local storage 522, 524 may be fixed, removable or upgradeable as desired. Local storage 522, 524 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 512, 514 need at runtime. The ROM may store static data and instructions that are needed by processing unit(s) 512, 514. The permanent storage device may be a non-volatile read-and-write memory device that may store instructions and data even when a module including one or more processing units 512, 514 and local storage 522, 524 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 522, 524 may store one or more software programs to be executed by processing unit(s) 512, 514, such as an operating system and/or programs implementing various server functions such as functions of network analytic system 120, or any other server(s) associated with network analytic system 120. "Software" refers generally to sequences of instructions that, when executed by processing unit(s) 512, 514 cause computing system 502 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 512, 514. In some embodiments the instructions may be stored by storage subsystem 568 (e.g., computer readable storage media). In various embodiments, the processing units may execute a variety of programs or code instructions and may maintain multiple concurrently executing programs or processes. At any given time, some or all of the program code to be executed may be resident in local storage 522, 524 and/or in storage subsystem including potentially on one or more storage devices. Software may be implemented as a single program or a collection of separate programs or program modules that interact as desired. From local storage 522, 524 (or non-local storage described below), processing unit(s) 512, 514 may retrieve program instructions to execute and data to process in order to execute various operations described above.

Storage subsystem 568 provides a repository or data store for storing information that is used by computing system 502. Storage subsystem 568 provides a tangible non-transitory computer-readable storage medium for storing the basic programming and data constructs that provide the functionality of some embodiments. Software (programs, code modules, instructions) that when executed by processing subsystem 510 provide the functionality described above may be stored in storage subsystem 568. The software may be executed by one or more processing units of processing subsystem 510. Storage subsystem 568 may also provide a repository for storing data used in accordance with the present disclosure.

Storage subsystem 568 may include one or more non-transitory memory devices, including volatile and non-volatile memory devices. As shown in FIG. 5, storage subsystem 568 includes a system memory 560 and a computer-readable storage media 552. System memory 560 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 502, such as during start-up, may typically be stored in the ROM. The RAM typically contains data and/or program modules that are presently being operated and executed by processing subsystem 510. In some implementations, system memory 560 may include multiple different types of memory, such as static random access memory (SRAM) or dynamic random access memory (DRAM). Storage subsystem 568 may be based on magnetic, optical, semiconductor, or other data storage media. Direct attached storage, storage area networks, network-attached storage, and the like may be used. Any data stores or other collections of data disclosed herein as being produced, consumed, or maintained by a service or server may be stored in storage subsystem 568.

By way of example, and not limitation, as depicted in FIG. 5, system memory 560 may store application programs 562, which may include client applications, Web browsers, mid-tier applications, relational database management systems (RDBMS), etc., program data 564, and one or more operating systems 566. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 552 may store programming and data constructs that provide the functionality of some embodiments. Software (programs, code modules, instructions) that when executed by processing subsystem 510 a processor provide the functionality described above may be stored in storage subsystem 568. By way of example, computer-readable storage media 552 may include non-volatile memory such as a hard disk drive, a magnetic disk drive, an optical disk drive such as a CD ROM, DVD, a Blu-Ray® disk, or other optical media. Computer-readable storage media 552 may include, but is not limited to, Zip® drives, flash memory cards, universal serial bus (USB) flash drives, secure digital (SD) cards, DVD disks, digital video tape, and the like. Computer-readable storage media 552 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 552 may provide storage of computer-readable instructions, data structures, program modules, and other data for computing system 502.

In certain embodiments, storage subsystem 568 may also include a computer-readable storage media reader 550 that may further be connected to computer-readable storage media 552. Together and, optionally, in combination with system memory 560, computer-readable storage media 552 may comprehensively represent remote, local, fixed, and/or removable storage devices plus storage media for storing computer-readable information.

In certain embodiments, computing system 502 may provide support for executing one or more virtual machines. Computing system 502 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 502. Accordingly, multiple operating systems may potentially be run concurrently by computing system 502. Each virtual machine generally runs independently of the other virtual machines.

Communication subsystem 540 provides an interface to other computer systems and networks. Communication subsystem 540 serves as an interface for receiving data from and transmitting data to other systems from computing system 502. For example, communication subsystem 540 may enable computing system 502 to establish a communication channel to one or more client computing devices via the Internet for receiving and sending information from and to the client computing devices.

Communication subsystem 540 may support both wired and/or wireless communication protocols. For example, in certain embodiments, communication subsystem 540 may include radio frequency (RF) transceiver components for accessing wireless voice and/or data networks (e.g., using cellular telephone technology, advanced data network technology, such as 3G, 2G or EDGE (enhanced data rates for global evolution), WiFi (IEEE 802.11 family standards, or other mobile communication technologies, or any combination thereof), global positioning system (GPS) receiver components, and/or other components. In some embodiments, communication subsystem 540 may provide wired network connectivity (e.g., Ethernet) in addition to or instead of a wireless interface.

Communication subsystem 540 may receive and transmit data in various forms. For example, in some embodiments, communication subsystem 540 may receive input communication in the form of structured and/or unstructured data feeds, event streams, event updates, and the like. For example, communication subsystem 540 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 540 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 540 may also be configured to output the structured and/or unstructured data feeds, event streams, event updates, and the like to one or more databases that may be in communication with one or more streaming data source computers coupled to computing system 502.

Communication subsystem 540 may provide a communication interface 542, e.g., a WAN interface, which may provide data communication capability between the local area network (bus subsystem 570) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 502 may operate in response to requests received via communication interface 542. Further, in some embodiments, communication interface 542 may connect computing systems 502 to each other, providing scalable systems capable of managing high volumes of activity. Conventional or other techniques for managing server systems and server farms (collections of server systems that cooperate) may be used, including dynamic resource allocation and reallocation.

Computing system 502 may interact with various user-owned or user-operated devices via a wide-area network such as the Internet. An example of a user-operated device is shown in FIG. 5 as client computing system 502. Client computing system 504 may be implemented, for example, as a consumer device such as a smart phone, other mobile phone, tablet computer, wearable computing device (e.g., smart watch, eyeglasses), desktop computer, laptop computer, and so on.

For example, client computing system 504 may communicate with computing system 502 via communication interface 542. Client computing system 504 may include conventional computer components such as processing unit(s) 582, storage device 584, network interface 580, user input device 586, and user output device 588. Client computing system 504 may be a computing device implemented in a variety of form factors, such as a desktop computer, laptop computer, tablet computer, smart phone, other mobile computing device, wearable computing device, or the like.

Processing unit(s) 582 and storage device 584 may be similar to processing unit(s) 512, 514 and local storage 522, 524 described above. Suitable devices may be selected based on the demands to be placed on client computing system 504; for example, client computing system 504 may be implemented as a "thin" client with limited processing capability or as a high-powered computing device. Client computing system 504 may be provisioned with program code executable by processing unit(s) 582 to enable various interactions with computing system 502 of a message management service such as accessing messages, performing actions on messages, and other interactions described above. Some client computing systems 504 may also interact with a messaging service independently of the message management service.

Network interface 580 may provide a connection to a wide area network (e.g., the Internet) to which communication interface 540 of computing system 502 is also connected. In various embodiments, network interface 580 may include a wired interface (e.g., Ethernet) and/or a wireless interface implementing various RF data communication standards such as Wi-Fi, Bluetooth, or cellular data network standards (e.g., 3G, 2G, LTE, etc.).

User input device 586 may include any device (or devices) via which a user may provide signals to client computing system 504; client computing system 504 may interpret the signals as indicative of particular user requests or information. In various embodiments, user input device 586 may include any or all of a keyboard, touch pad, touch screen, mouse or other pointing device, scroll wheel, click wheel, dial, button, switch, keypad, microphone, and so on.

User output device 588 may include any device via which client computing system 504 may provide information to a user. For example, user output device 588 may include a display to display images generated by or delivered to client computing system 504. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 588 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 512, 514 and 582 may provide various functionality for computing system 502 and client computing system 504, including any of the functionality disclosed herein as being performed by a server or client, or other functionality associated with message management services.

It will be appreciated that computing system 502 and client computing system 504 are illustrative and that variations and modifications are possible. Computer systems used in connection with embodiments of the present disclosure may have other capabilities not specifically described here. Further, while computing system 502 and client computing system 504 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method performed by a computer system, the method comprising:
  receiving a document from a server, the document is usable to render a web page;
  parsing the document to render the web page, wherein parsing the document causes one or more functions to be invoked which results in at least one of the one or more functions failing to produce an output or producing an error because of a system not supporting the function, wherein each function of the one or more functions is associated with a function type among one or more types of functions;
  while parsing the document, measuring a number of times each of the one or more types of functions is invoked;
  generating a first signature for the web page, wherein the first signature includes an attribute comprising:
    a type of function of the one or more types of functions invoked when parsing the document; and
    a number of times the type of function was invoked when parsing the document;
  determining a classification for the web page using the first signature, the classification indicating that the web page is malicious, the classification indicating a type of network attack associated with the web page; and providing information that indicates the classification of the web page.

2. The method of claim 1, wherein the first signature includes multiple attributes, wherein a first attribute of the multiple attributes is based upon a first type of function, and wherein a second attribute of the multiple attributes is based upon a second type of function.

3. The method of claim 2, wherein each attribute is weighted before generating the first signature.

4. The method of claim 1, wherein the attribute further includes:
 a second type of function of the one or more types of functions invoked when parsing the document; and
 a number of times the second type of function was invoked when parsing the document.

5. The method of claim 4, wherein the attribute further indicates an ordering of the type of function and the second type of function relative to when each is invoked while rendering the web page.

6. The method of claim 1, wherein determining the classification for the web page further uses a second signature of the web page and a third signature of the web page.

7. The method of claim 6, wherein the third signature includes an attribute different than an attribute included in the first signature.

8. The method of claim 1, wherein determining the classification of the web page comprises:
 comparing the first signature to a second signature to determine the classification, wherein the first signature is for the web page in a first state, and wherein the second signature is for the web page in a second state.

9. The method of claim 1, wherein determining the classification of the web page comprises:
 comparing the first signature to a second signature to determine the classification, wherein the second signature is for a second web page, wherein a classification for the second web page is known, and wherein the second web page is different than the web page for which classification is requested.

10. The method of claim 1, wherein determining the classification for the web page is based upon:
 comparing the first signature with a second signature; or
 a classification model that is trained using the second signature.

11. The method of claim 10, wherein comparing the first signature with the second signature results in a similarity score that is used to determine the classification based upon a predetermined threshold.

12. The method of claim 1, wherein the document is in Hypertext Markup Language (HTML).

13. A non-transitory computer-readable storage medium storing a plurality of instructions executable by one or more processors of a computer system, the plurality of instructions when executed by the one or more processors cause the one or more processors to:
 receive a document from a server, the document is usable to render a web page;
 parse the document to render the web page, wherein parsing the document causes one or more functions to be invoked, wherein each function of the one or more functions is associated with a function type among one or more types of functions;
 while parsing the document, for each of the one or more types of functions, incrementing a counter each time the respective type of function is invoked to measure a number of times the respective type of function is invoked;
 generate a first signature for the web page, wherein the first signature includes an attribute comprising:
  a type of function of the one or more types of functions invoked when parsing the document; and
  a number of times the type of function was invoked when parsing the document;
 determine a classification for the web page using the first signature, the classification indicating that the web page is malicious, the classification indicating a type of network attack associated with the web page; and
 provide information that indicates the classification of the web page.

14. The non-transitory computer-readable storage medium of claim 13, wherein the first signature includes multiple attributes, wherein a first attribute of the multiple attributes is based upon a first type of function, and wherein a second attribute of the multiple attributes is based upon a second type of function.

15. The non-transitory computer-readable storage medium of claim 13, wherein the attribute further includes:
 a second type of function of the one or more types of functions invoked when parsing the document; and
 a number of times the second type of function was invoked when parsing the document.

16. The non-transitory computer-readable storage medium of claim 15, wherein the attribute further indicates an ordering of the type of function and the second type of function relative to when each is invoked while rendering the web page.

17. The non-transitory computer-readable storage medium of claim 13, wherein determining the classification for the web page further uses a second signature of the web page and a third signature of the web page, and wherein the third signature includes an attribute different than an attribute included in the first signature.

18. The non-transitory computer-readable storage medium of claim 13, wherein determining the classification of the web page comprises:
 comparing the first signature to a second signature to determine the classification, wherein the first signature is for the web page in a first state, and wherein the second signature is for:
  the web page in a second state; or
  a second web page, wherein a classification for the second web page is known, and wherein the second web page is different than the web page for which classification is requested.

19. A system comprising:
one or more processors; and
a non-transitory computer-readable medium including instructions that, when executed by the one or more processors, cause the one or more processors to:
 receive a document from a server, the document is usable to render a web page;
 parse the document to render the web page, wherein parsing the document causes one or more functions to be invoked, wherein each function of the one or more functions is associated with a function type among one or more types of functions;
 while parsing the document, measure a number of times each of the one or more types of functions is invoked;
 generate a first signature for the web page, wherein the first signature includes an attribute comprising:

a type of function of the one or more types of functions invoked when parsing the document; and
　　　a number of times the type of function was invoked when parsing the document;
　　determine a classification for the web page by comparing the first signature to a second signature, wherein the first signature is for the web page at a first time instance, and wherein the second signature is for the web page at a second time instance that is different from the first time instance, the classification indicating that the web page is malicious, the classification indicating a type of network attack associated with the web page; and
　　provide information that indicates the classification of the web page.

20. The method of claim 1, wherein at least one function of the one or more functions is associated with a first web browser; and
　　wherein parsing the document causes the at least one function to be invoked on a second web browser such that the at least one function at least one of (A) fails to produce an output when invoked on the second web browser or (B) produces an error when invoked on the second web browser because of the second web browser not supporting the at least one function.

\* \* \* \* \*